(12) United States Patent
Schützmann et al.

(10) Patent No.: US 9,336,640 B2
(45) Date of Patent: May 10, 2016

(54) SECURITY ELEMENT FOR SECURING DOCUMENTS OF VALUE

(75) Inventors: Jürgen Schützmann, Pfaffenhofen (DE); Wolfgang Rauscher, München (DE); Manfred Heim, München (DE); Friedrich Kretschmar, München (DE); Frank Pitter, Grasbrunn (DE); Dieter Stein, Holzkirchen (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 1796 days.

(21) Appl. No.: 12/602,942

(22) PCT Filed: Jun. 3, 2008

(86) PCT No.: PCT/EP2008/004419
§ 371 (c)(1),
(2), (4) Date: Dec. 3, 2009

(87) PCT Pub. No.: WO2008/148523
PCT Pub. Date: Dec. 11, 2008

(65) Prior Publication Data
US 2010/0219245 A1    Sep. 2, 2010

(30) Foreign Application Priority Data
Jun. 4, 2007   (DE) .......................... 10 2007 025 939

(51) Int. Cl.
*G06K 7/08* (2006.01)
*G07D 7/04* (2016.01)
(Continued)

(52) U.S. Cl.
CPC ................ *G07D 7/04* (2013.01); *B42D 25/355* (2014.10); *G06K 19/06187* (2013.01); *B42D 2033/16* (2013.01)

(58) Field of Classification Search
USPC ......................................................... 235/449
See application file for complete search history.

(56) References Cited

U.S. PATENT DOCUMENTS

| 4,237,189 A | 12/1980 | Deffeyes |
| 4,281,043 A * | 7/1981 | Deffeyes ................ G06K 19/02 252/62.54 |

(Continued)

FOREIGN PATENT DOCUMENTS

| DE | 2451796 | 5/1975 |
| DE | 10317810 A1 | 11/2004 |

(Continued)

OTHER PUBLICATIONS

Search Report of German Patent Office related to German Patent 2008, Application No. 10 2007 025 939.7, Feb. 18, 2008.

*Primary Examiner* — Michael G Lee
*Assistant Examiner* — David Tardif
(74) *Attorney, Agent, or Firm* — Bacon & Thomas, PLLC (57) ABSTRACT

The invention relates to a security element for securing documents of value. Along the security element a portion of a magnetic coding with first and second coding elements is arranged. The coding elements are arranged along a predetermined direction, wherein the first coding element continuously has along the predetermined direction a first magnetic region with a first coercive field strength and the second coding element has at least one first gap region and one second magnetic region with a second coercive field strength. At least one of the first magnetic regions is directly adjacent to at least one of the second magnetic regions. The sum of the lengths of the directly adjacent first and second magnetic regions amounts to a maximum of 8 mm.

20 Claims, 4 Drawing Sheets (51) Int. Cl.
 *G06K 19/06* (2006.01)
 *B42D 25/355* (2014.01)

(56) References Cited

U.S. PATENT DOCUMENTS

| | | | |
|---|---|---|---|
| 5,378,885 A | 1/1995 | Jones, Jr. et al. | |
| 5,834,748 A * | 11/1998 | Litman | G06K 7/084 235/449 |
| 5,889,271 A * | 3/1999 | Webb | G07D 7/00 235/462.01 |
| 6,146,773 A * | 11/2000 | Kaule | D21H 21/48 235/493 |
| 6,343,745 B1 | 2/2002 | Bohm | |
| RE39,490 E * | 2/2007 | Cote | G06K 19/18 194/213 |
| 2006/0097512 A1 * | 5/2006 | Isherwood | D21H 21/42 283/72 |
| 2009/0008922 A1 | 1/2009 | Schutzmann | |

FOREIGN PATENT DOCUMENTS

| | | | |
|---|---|---|---|
| DE | 10 2004 049 999 A1 | 1/2006 | |
| EP | 1229482 A2 * | 8/2002 | G06K 7/00 |
| KR | EP 1229482 A2 * | 8/2002 | G06K 7/10336 |
| WO | WO 90/08367 A1 | 7/1990 | |
| WO | WO 93/09532 A1 | 5/1993 | |
| WO | 9630880 A1 | 10/1996 | |
| WO | 9825236 A1 | 6/1998 | |

\* cited by examiner

SECURITY ELEMENT FOR SECURING DOCUMENTS OF VALUE

FIELD OF THE INVENTION

The invention relates to a security element for securing documents of value that has magnetic material. Furthermore the invention relates to a document of value as well as a foil material with the security element and a measurement setup with a magnetic sensor and a document of value with the security element.

BACKGROUND

Documents of value within the terms of the invention can be bank notes identification documents, check cards, credit cards, but also share certificates, deeds, stamps, checks, admission tickets, tickets, flight tickets, identity cards, visa stickers and the like, as well as labels, seals, packagings or other elements. The simplifying designation "document of value" will hereinafter therefore always include documents of the stated type.

It is known from the state of the art to equip documents of value with security elements, such as security strips or also security threads, which contain magnetic material. The magnetic material therein can be applied on the security element either continuously or only in some regions, for example in the form of a coding. To magnetically code a security thread there is used for example a certain sequence of magnetic and non-magnetic regions that is characteristic of the type of document of value to be secured. Moreover it is known to use different magnetic materials for a coding, for example with different coercive field strength.

In the magnetic codings known so far for example two magnetic materials of different coercive strength are used, from which two types of magnet bits are formed. Along the magnetic coding the magnetic bits of different coercive strength are spaced apart from each other, e. g. separated by non-magnetic material.

For checking security elements by machine that have a magnetic coding along their longitudinal direction it is necessary that the magnetic coding can be detected upon different transport directions of the security element relative to the magnetic sensor. This is to be ensured in particular upon a transport of the security element parallel to the direction of the magnetic coding. In this measurement geometry it is difficult with regard to measuring technology to detect the magnetic regions of different coercive strength separately from each other in the magnetic codings known so far. By spacing the adjacent magnetic bits further magnetization steps and consequently further magnetic signals are added, which can overlap strongly. This is problematic particularly in conventional magnetic sensors, which are not suitable for distinguishing the magnetic regions of different coercive strength.

It is therefore the object of the invention to specify a magnetic coding with magnetic materials of different coercive strength for a security element in which the magnetic coding can be measured reliably also in the measurement geometry when the security element is transported along the magnetic coding.

It is furthermore an object of the invention to provide a security element, a document of value with the security element, as well as a measurement setup and a method for checking the document of value.

SUMMARY

The inventive security element contains at least one portion of a magnetic coding that has at least one first coding element and at least one second coding element. The first and second coding elements are arranged along a predetermined direction on or in the security element. The first coding element continuously has along the predetermined direction a first magnetic region with a first coercive field strength, the second coding element contains a first gap region and a second magnetic region with a second coercive field strength that differs from the first coercive field strength. The first magnetic region is arranged along the predetermined direction directly adjacent to the second magnetic region. Furthermore the lengths of the first and the second magnetic region are chosen in such a fashion that the sum of the lengths of the first and the second magnetic region along the predetermined direction amounts to a maximum of 8 mm.

The coding elements are arranged along a predetermined direction essentially in a line. The first magnetic region continuously contains along the predetermined direction a first magnetic material, and the second magnetic region continuously contains along the predetermined direction a second magnetic material. The specification "continuous" within the terms of this application is to be understood as continuous along an imaginary, straight line. In magnetic sensors with low resolution a magnetic region with interruptions that are much shorter than the resolution of the used magnetic sensor provides essentially the same magnetic signal as a continuous magnetic region. Consequently also a magnetic region with very short interruptions that are much shorter than the resolution of the magnetic sensor can be considered as continuous. In the used magnetic sensors these interruptions can e. g. have a length of up to 0.5 mm, preferably up to 0.3 mm. In contrast to the interruptions, the first and second magnetic regions each have at least a length of 1 mm, preferably of at least 2 mm.

The magnetic region(s) and the gap region(s) are arranged along a predetermined direction along the security element. This direction extends preferably parallel to a longitudinal direction of the security element. The "longitudinal direction" of the security element here refers to the direction in which the security element has its largest expansion.

Preferably the first coding element consists along the predetermined direction of a first magnetic region, and the second coding element consists along the predetermined direction of the first gap region and the second magnetic region. The second coding element can be configured here as a second coding element of a first type, in which the second magnetic region is arranged after the first gap region along the predetermined direction. The second coding element alternatively can be configured as a second coding element of a second type, in which the second magnetic region is arranged before the first gap region along the predetermined direction. The second magnetic region of the second coding element along the predetermined direction can have for example a length of 10% up to 70% of the length of the second coding element, preferably a length of 30% up to 70%, particularly of 40% up to 60%. In a special embodiment the first gap region and/or the second magnetic region along the predetermined direction has/have a length of 1 mm to 4 mm, preferably of 2 mm to 3 mm.

The security element preferably has several pairs of a first and a second coding element, wherein the first and the second coding element along the predetermined direction are directly mutually adjacent. Preferably, however, the magnetic coding contains no directly mutually adjacent first coding elements along the predetermined direction and/or no directly mutually adjacent second coding elements along the predetermined direction.

In some embodiments the magnetic coding furthermore has at least one third coding element that is arranged together with the first and second coding element along the predetermined direction. The third coding element along the predetermined direction consists continuously of a second gap region. Preferably a maximum of four third coding elements of the magnetic coding along the predetermined direction are directly mutually adjacent. The first and/or the third coding element along the predetermined direction can have a length of 2 mm to 8 mm, preferably of 3 mm to 6 mm, in particular of approximately 4 mm.

In a preferred embodiment the magnetic coding consists of at least one of the first coding elements and at least one of the second coding elements and at least one or none of the third coding elements.

The first and the second magnetic region, preferably all directly mutually adjacent first and second magnetic regions, are limited along the predetermined direction on both sides by gap regions, in particular by a first and a second gap region or by two second gap regions.

Preferably the magnetic coding consists of a periodically recurring arrangement of the first, second and, if applicable, the third coding elements. In the periodically recurring arrangement the coding elements along the predetermined direction are arranged in a predetermined order. Preferably the periodically recurring arrangement has at least two of the first and two of the second coding elements, in particular at least two pairs of a first and a second coding element, wherein the first and second coding element along the predetermined direction are directly mutually adjacent. The periodically recurring arrangement can consist of 6 to 18 of the coding elements, preferably of 8 to 16 of the coding elements, particularly of 10 to 14 of the coding elements.

In the following some special embodiments of the periodically recurring arrangement are specified, of which the magnetic coding of the security element can be composed. This is shown merely by way of example by means of a selection of periodically recurring arrangements composed of 14 of the coding elements. The periodically recurring arrangement along the predetermined direction consists for example of one of the following periods of the coding elements designated with a) to x), wherein A symbolizes the first coding element and B the second coding element of the first type and L the third coding element. Corresponding orders can also be found for any desired other numbers of coding elements:

a) LLLBALLLBALLBA
b) LLLBALLLBABABA
c) LLLBALLBALBABA
d) LLLBALLBABALBA
e) LLLBALBALLBABA
f) LLLBALBALBALBA
g) LLLBABALLLBABA
h) LLBALLBALLBABA
i) LLBALLBALBALBA
j) LLBALBALLBALBA
k) LLLBALBABABABA
l) LLLBABABALBABABA m) LLBALLBABABABA
n) LLBALBALBABABA
o) LLBALBABALBABA
p) LLBALBABABALBA
q) LLBABALLBABABA
r) LLBABALBALBABA
s) LBALBALBALBABA
t) LLBABABABABABA
u) LBALBABABABABA
v) LBABALBABABABA
w) LBABABALBABABA
x) BABABABABABABA

From the periods there arise, for example through cyclical rotation of individual ones of the coding elements, further periods, from which a magnetic coding can likewise be composed. The cyclical rotation takes place e. g. through the stepwise shifting of individual ones of the coding elements from the left to the right end of the specified periods. A cyclical rotation consists in a stepwise shifting of individual coding elements from the start of a period to the end of the period in question. In the specified example of the period a) one single cyclical rotation means a shift of the left gap element L to the end of the period a), thus resulting in the period LLBALLLBALLBAL. Accordingly, two cyclical rotations lead to the period LBALLLBALLBALL, etc.

The magnetic codings are the result of a multiple repetition of the individual periods and have no defined start and no defined end. Consequently the magnetic codings are not defined by their start and their end, but by the respective order of the coding elements. Due to the multiple repetition of the periods the cyclical rotations of a period indeed lead to a different period. However, no new magnetic coding can be composed from the cyclically rotating period. For defining the magnetic codings thus respectively any desired successive (in the above example 14) coding elements of the respective magnetic coding can be summed up to form a period. The respectively specified period consequently is only one of several possible periods to describe the respective magnetic coding.

Besides the above-specified magnetic codings with 14 coding elements per period, magnetic codings can be formed analogously also from periodical arrangements of any desired other numbers of coding elements per period. As a second example there shall be shown here exemplarily a selection of magnetic codings that have a period of 8 of the coding elements A, B, L. The periodically recurring arrangement then for example consists of the following periods along the predetermined direction:

8a) LLLBALBA
8b) LLBALLBA
8c) LLBABABA

-continued

8d) LBALBABA

8e) BABABABA

As a third example a selection of magnetic codings with a period of 10 of the coding elements A, B, L is specified. The periodically recurring arrangement then for example consists of the following periods along the predetermined direction:

10a) LLLBALLLBA

10b) LLLBALBABA

10c) LLBALLBABA

10d) LLBALBALBA

10e) LLBABABABA

10f) LBALBABABA

10g) LBABALBABA

10h) BABABABABA

Proceeding from the magnetic codings with the above-specified periods the security element can also have different modifications of the magnetic codings. This can be e. g. a mirroring of the magnetic coding, which can be achieved by—proceeding from a period—firstly reversing the order of the coding elements with respect to the predetermined order and, secondly, replacing all second coding elements of the first type B by second coding elements of the second type B'. From this reversed period there can be composed magnetic codings mirrored with respect to the magnetic codings, being mirrored on an axis extending perpendicularly to the predetermined direction. The periodically recurring arrangement thus can also consist of one period that is mirrored with respect to one of the above-mentioned periods, or of a portion of one or several of said periods. The periodically recurring arrangement can also be formed by adding one or more of the first and/or second and/or third coding elements to one or more of these periods.

A further modification of the magnetic codings consists in replacing one or more of the first coding elements A by an equivalent number of third coding elements L. Alternatively or additionally also one or more of the second coding elements B can be replaced by an equivalent number of third coding elements L. The specified modifications can also be combined with each other and/or with cyclical rotations and are not only applicable to the explicitly specified magnetic codings, but correspondingly also to all other inventive magnetic codings, for example with a different number of coding elements per period.

The specified periods can be composed of first, second and third coding elements of equal length. The lengths of the first and/or the second and/or the third coding elements can also be different, however. Furthermore the period can also have different first coding elements and/or different second coding elements and/or different third coding elements, for example with different lengths.

Generally the inventive security element contains at least one characteristic magnetic structure that is described in the following. This structure can, but does not necessarily have to, be provided for the purpose of a magnetic coding of the security element.

The security element contains at least two gap regions and at least one magnetic partial region, which are arranged along a predetermined direction. The magnetic partial region has a first magnetic region with a first coercive field strength and a second magnetic region with a second coercive field strength, wherein the first and the second coercive field strength are different. The first and the second magnetic region along the predetermined direction are directly mutually adjacent. The magnetic partial region and the at least two gap regions can be parts of a magnetic coding, in particular parts of a periodically recurring arrangement of a magnetic coding. The magnetic partial region consists for example of the first and the second magnetic region. Preferably the sum of the lengths of the first and of the second magnetic region along the predetermined direction amounts to a maximum of 8 mm. Furthermore the security element can have along the predetermined direction several spaced-apart magnetic partial regions. Between these in particular respectively one or more gap regions are arranged. Along the predetermined direction one of the at least two gap regions is arranged before the magnetic partial region and one of the at least two gap regions is arranged after the magnetic partial region. The at least two gap regions are in particular two of the first gap regions or the first and second gap region.

The first and second magnetic regions along the predetermined direction are arranged essentially side by side. In a top view of the plane of the security element they are therefore located side by side. In particular the first and second magnetic regions are not arranged on top of each other. Moreover, the first and second magnetic regions are preferably arranged in one plane, but, for production reasons, can also be arranged at a slight offset in a direction perpendicular to the plane of the security element.

Preferably the edges of the directly mutually adjacent first and second magnetic regions adjoin each other as exactly as possible, that is with a minimal overlap or distance from each other. However, in a two-step printing process with the different coercive magnetic materials it is unavoidable that the edges of the magnetic regions with different coercive strength, which nominally are printed exactly side by side, in fact do not meet quite exactly. The first and second magnetic regions can, for reasons of production engineering, be placed directly mutually adjacent only insofar as can be realized within print tolerance. The directly mutually adjacent first and second magnetic regions can therefore also overlap slightly or have a slight distance from each other. For the purposes of this application, distances and overlaps of the first and second magnetic regions that are within print tolerance are still to be considered as directly mutually adjacent. Depending on the alignment accuracy of the two printing steps for the magnetic materials with different coercive strength, distances and overlaps are within print tolerance when they are for example up to 1 mm along the predetermined direction, in particular up to 0.5 mm, for example up to 0.3 mm.

The security element can furthermore have one or more further magnetic regions that have the first coercive field strength, wherein these consist in particular of the same magnetic material as the first magnetic region. Additionally or alternatively the security element can have one or more further magnetic regions that have the second coercive field strength, wherein these consist in particular of the same magnetic material as the second magnetic region. The further magnetic region(s) is/are limited on both sides by first and/or second gap regions. The further magnetic regions are formed for example through the above-mentioned modification of the respective periods, in which a plurality of first coding elements A is replaced by a corresponding number of third coding elements L or also a plurality of the second coding elements B is replaced by a corresponding number of third coding elements L.

In a particularly preferred embodiment the sum of the lengths of the first and second magnetic region along the predetermined direction is chosen in such a fashion that a constructive interference of the magnetic signals results. In particular such magnetic signals can interfere with each other constructively that are detected at the start and at the end of a pair of the first and the second magnetic region by a magnetic sensor, when the security element is transported past the magnetic sensor parallel or contrary to the predetermined direction. With the aid of the constructive interference of the magnetic signals at the magnetic sensor a measuring signal results that has a greater maximum amplitude than the individual magnetic signals themselves. This can be used advantageously in the case of relatively low signal amplitudes, such as occur for example in the magnetic signals of security threads in the transverse transport of bank notes.

The directly mutually adjacent first and second magnetic regions are limited by two magnetization steps along the predetermined direction. A magnetization step refers to a steplike change in the remanent flux density which results at the transition between a magnetic region and a gap region. The steplike change of the remanent flux density can be realized through a steplike change of the concentration and/or the layer thickness and/or the width of the magnetic material. With the preferred length of the first and second magnetic region the size of the distance between the two magnetization steps along the predetermined direction is chosen in such a fashion that the magnetic signals of the two magnetization steps interfere with each other constructively.

In preferred embodiments the sum of the lengths of the first and second magnetic region along the predetermined direction amounts to a maximum of 7 mm, preferably a maximum of 6 mm, particularly preferably a maximum of 5 mm, in particular a maximum of 4 mm. This can apply to one or also to all of the directly mutually adjacent first and second magnetic regions.

Preferably the first and second coercive field strength differ by at least a factor 2, preferably by at least a factor 5. The first coercive field strength is for example smaller than the second coercive field strength, but it can also be greater. In a special embodiment the first and the second magnetic region have approximately the same remanent flux density. These can also differ from each other by up to 10%, however. The magnetic material of the magnetic regions is e. g. magnetic pigments. The magnetic material can have magnetically hard material, preferably one or more different iron compounds, particularly preferably one or more different iron oxides or magnetite.

The first and second magnetic regions and/or the first and second gap regions in one embodiment extend over the complete width of the security element. The width of the security element is the extension perpendicular to the predetermined direction, for example perpendicular to the longitudinal direction of the security element. In a further embodiment the first and second magnetic regions are arranged in one or in both edge regions of the security element. The first and second magnetic regions can form one or two edge tracks arranged parallel to the predetermined direction in or on the security element. The two edge tracks preferably have the same magnetic coding, in particular the same portion of one of the magnetic codings. In and/or on the regions of the security element that are arranged outside of the magnetic regions marking elements such as characters, symbols, text or also patterns can be incorporated. Through these marking elements the security element can be marked individually, i. e. corresponding to its field of application, e. g. depending on the type of document of value to be secured. The marking elements can be arranged outside of the edge tracks, for example between the two edge tracks on and/or in the security element.

The gap regions continuously have along the predetermined direction a lower remanent flux density than the first and second magnetic region. For example the gap regions along the predetermined direction do not contain any magnetic material. For realizing a continuously low remanent flux density in the gap regions the gap regions for example have a lower concentration of the magnetic material than the magnetic regions. Alternatively or additionally it is also possible that in the gap regions a lower layer thickness or also a smaller width of the magnetic material or also a different magnetic material is applied than in the magnetic regions. Preferably the remanent flux density and/or the concentration and/or the layer thickness and/or the width of the magnetic material of the gap regions amounts to less than 50%, preferably less than 10%, of the remanent flux density and/or the concentration and/or the layer thickness and/or the width of the magnetic material of the magnetic regions.

The security element, for example a security thread or a planchet or a label, can be produced directly on a document of value or on a security paper, but it can also be prepared on a separate substrate. If it would cause difficulties for example to provide the document of value with the magnetic materials directly, it may be expedient to prepare the build-up of the security element at least partly on the separate substrate. The separate substrate on which the security element can be applied, preferably has plastic and can for example be or have a foil material, in particular a transfer material. The security element, in particular the magnetic materials of the security element, can for example be applied in endless form on a carrier material of the transfer material. The fastening of the security element on a document of value to be secured here is effected with the aid of an adhesive layer, which is applied on the document of value or also on the topmost layer of the transfer material. After the transfer the carrier material of the transfer material is stripped off and only the security element remains on the document of value to be secured.

Moreover, the security element can also have one or more further security features, in particular optically variable security features. These further security features can be arranged partly or completely on or also in the security element. The security element can in particular have one or several of the following optically variable security features: Diffraction structures, such as e, g. holograms, matt structures, optically variable coatings, such as e. g. interference layers, optically variable inks, such as e. g. inks with interference pigments or metallic effect inks, or also embossings with inks printed on their flanks.

The document of value equipped with the security element is preferably a security document, for example a bank note, an identification card, a check card or product packagings. Other objects of value, for which a protection in terms of security is required, of course can also be provided with the security element according to the invention.

Furthermore the invention relates to a method for checking documents of value with one or several security elements, in which magnetic signals of the security element are measured. The inventive method can be carried out with the aid of a measurement setup having at least one document of value equipped with the security element and a magnetic sensor.

For measuring the magnetic properties of the document of value and/or of the security element the document of value is transported past the magnetic sensor. The transport direction of the documents of value here can be either parallel or perpendicular to the longitudinal direction of the security element that is arranged in or on the document of value. The magnetic signals of the security element are received with the aid of the magnetic sensor and supplied to an evaluation device.

For example the transport direction of the documents of value extends parallel to the longitudinal direction of the security element. In this check of the security element the magnetic signals of the security element are detected in temporal succession in a single measuring track of the magnetic sensor. Preferably the magnetic regions along the security element are arranged in such a fashion that at least the magnetic signals of a first and a second magnetic region, in particular of the two magnetization steps, which limit a first and second magnetic region, interfere with each other constructively. The constructive interference of the magnetic signals can be achieved for example with inductively or also with magneto-resistively functioning magnetic sensors.

In particular the maximum amplitude of at least one magnet signal which results through transporting the security element past the magnet sensor is increased through constructive interference, in particular in comparison to a maximum amplitude of a reference magnet signal. The reference magnetic signal is the magnetic signal of one single magnetizing step of a reference magnetic region, which has approximately the same magnetization as the first and the second magnetic region, wherein the reference magnetic signal is detected at the magnetic sensor under the same measuring conditions as the magnetic signal of the first and second magnetic regions. To assess whether the maximum amplitude of the magnetic signal of the directly mutually adjacent first and second magnetic regions is increased through constructive interference, said amplitude is to be compared with the maximum amplitude of a reference magnetic signal. For this comparison the reference magnetic region can e. g. be provided with the same magnetization as the first and the second magnetic region. In case that the magnetizations of the first and the second magnetic region are different, the reference region for the comparison is magnetized approximately to the greater of the two magnetizations of the first and second magnetic region. The directly mutually adjacent first and second magnetic regions and the reference magnetic region are measured under the same measuring conditions and their magnetic signals are compared with each other.

BRIEF DESCRIPTION OF THE DRAWINGS

Further advantages and embodiments of the invention are explained in more detail with reference to the Figures. For clarity's sake the invention is explained in more detail only with reference to a bank note. It is obvious, however, that the invention can be used without any problems for the above-mentioned documents of value.

The figures are described as follows.

DETAILED DESCRIPTION OF VARIOUS EMBODIMENTS

Figure 1:
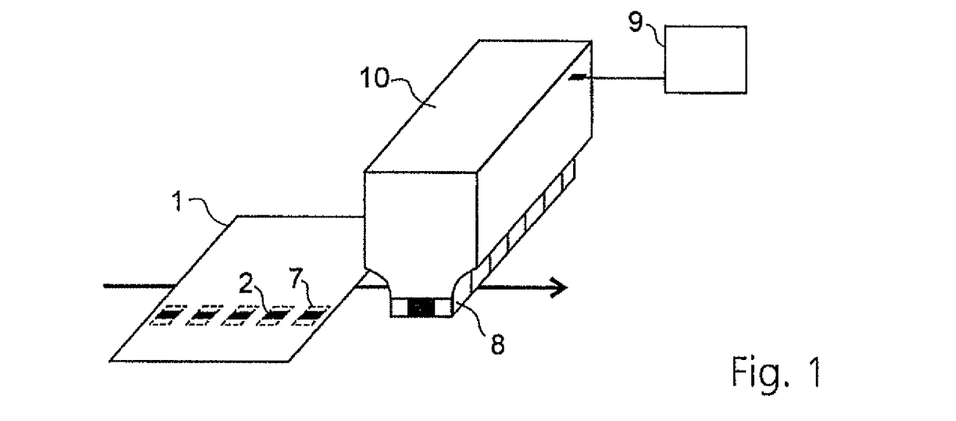
FIG. 1 a schematic arrangement of a magnetic sensor and a bank note with a security element transported past the magnetic sensor, FIG. 2a a characteristic section of a security element with a magnetic partial region consisting of two magnetic regions with different coercive field strength, FIG. 2b-c exemplary embodiments of the first coding element A, the second coding element of the first type B and the second type B' and the third coding element L, FIG. 3a an embodiment of a security element (portion I to II) with a magnetic coding (1, cf.

FIG. 1 schematically shows a portion of a device for checking bank notes for their magnetic properties. A bank note 1 to be checked with a security element 2 is transported through the device by a not shown transport system along the transport direction marked with the arrow in FIG. 1. In the shown example a bank note 1 is transported transversely past an inductively working magnetic sensor 10. Here the security element 2, which is arranged with its longitudinal direction along the transport direction of the bank note 1, is checked for its magnetic properties. The security element 2 is for example a security thread which is partially embedded in the banknote substrate and only comes to its surface or is visible on its surface in windows 7.

The magnetic sensor 10 has several measuring tracks 8 arranged along a line that is perpendicular to the transport direction of the bank notes. At the inductively working magnetic sensor 10 as magnetic signals respectively temporal changes of the magnetic properties in the detection range of the individual measuring tracks 8 of the magnetic sensor are detected. When transporting past a security element 2 that is provided continuously with magnetic material and whose magnetic properties are constant along the security element, the respective measuring tracks 8 would detect magnetic signals only at the start and the end of the security element 2. In contrast, when a security element 2 is transported past that has magnetic material only in some regions—for example within magnetic regions which are separated from each other by gap regions—additional magnetic signals result at each magnetization step, i. e. at the borders between the magnetic regions and the gap regions. The magnetic signals are transmitted by the magnetic sensor 10 to an evaluation device 9, which checks the authenticity and/or the currency and/or the emission and/or the denomination of the bank note 1.

Figure 2A:
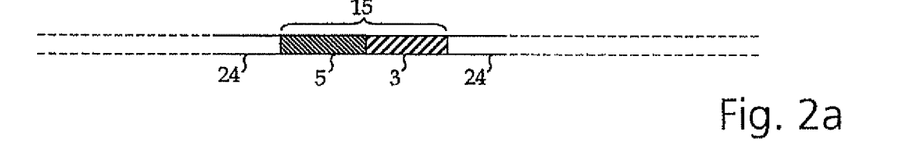

In FIG. 2a a section of a security element 2 is shown that contains a magnetic partial region 15. The magnetic partial region 15 consists of a first magnetic region 3 of a first coercive field strength and of a second magnetic region 5 of a second coercive field strength that is e. g. greater than the first. On both sides the magnetic partial region 15 is limited by gap regions 24 which do not contain any magnetic material. The security element 2 can, in addition to the shown magnetic partial region 15, for example contain further such magnetic partial regions 15 or also individual first magnetic regions 3 or also individual second magnetic regions 5 that are respectively limited on both sides by gap regions.

Figure 2B:
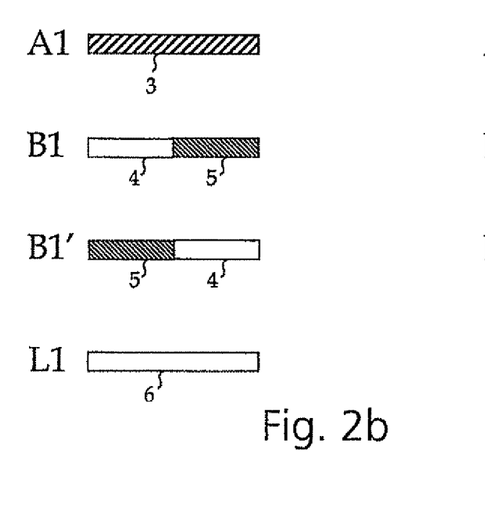

FIG. 2b shows an embodiment of three different coding elements A1, B1 and L1. These form a concrete example for the (generally formulated) first, second and third coding elements A, B, L. From several of these coding elements A1, B1, L1 a magnetic coding of the security element 2 can be composed. The first coding element A1 continuously has, along a predetermined direction that in FIG. 2a extends e. g. from left to right, a first magnetic region 3. The second coding element B1 in this example consists along the predetermined direction of a first gap region 4 and a second magnetic region 5 that are of approximately equal length. With 3000 Oe to 4200 Oe, corresponding to 239 kA/m to 334 kA/m, the second magnetic region 5 in this example has an essentially greater coercive field strength than the first magnetic region 3 with 200 Oe to 320 Oe, corresponding to 15.9 kA/m to 25.5 kA/m. The remanent flux density of the two magnetic regions 3 and 5 is approximately equal. The third coding element L1, which optionally can be contained in the different magnetic codings, continuously consists along the predetermined direction of a second gap region 6. The gap regions 4, 6 either have no magnetic material or have a essentially lower remanent flux density than the magnetic regions 3, 5. This can e. g. be achieved by a corresponding choice of the layer thicknesses and/or the concentrations and/or the width of the magnetic materials, e. g. the magnetic pigments.

Figure 2C:
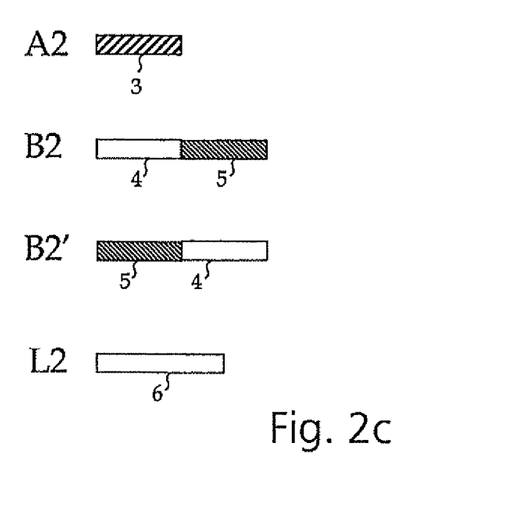

In FIG. 2c with A2, B2, L2 a further embodiment of the three coding elements A, B, L is shown, in which the lengths of the coding elements are different. The magnetic coding of the security element 2 can also be formed from several of the coding elements A2, B2, L2 or also by other embodiments of the coding elements, e. g. with different length ratios. Instead of the second coding element of the first type B1 or B2 also the second coding element of the second type B1' or B2' can be used, wherein the periods are then composed of the coding elements A1, B1', L1 or A2, B2', L2. Thereby the abovementioned mirrored magnetic codings can be formed that contain B'.

The magnetic codings can be formed by different embodiments of the first, second and third coding element, thus e. g. with the first coding elements A1, A2, with the second coding elements B1, B1', B2, B2' and with the third coding elements L1, L2, cf. FIGS. 2b, 2c. Using concrete embodiments of the coding elements, e. g. A1, B1, L1 or also A2, B2, L2 for the (generally formulated) coding elements A, B, L yields concrete embodiments of the periods, thus e. g. of the abovespecified periods a)-x) of 14 coding elements. The first coding element A can for example be formed by A1, the second coding element B by B1 and the third coding element L by L1. In the same fashion the first, second and third coding elements A, B, L can also be formed by further embodiments of coding elements, for example with coding elements that have different length ratios and/or whose magnetic and gap regions have different length ratios than the shown embodiments.

Figures 3A, 3B:
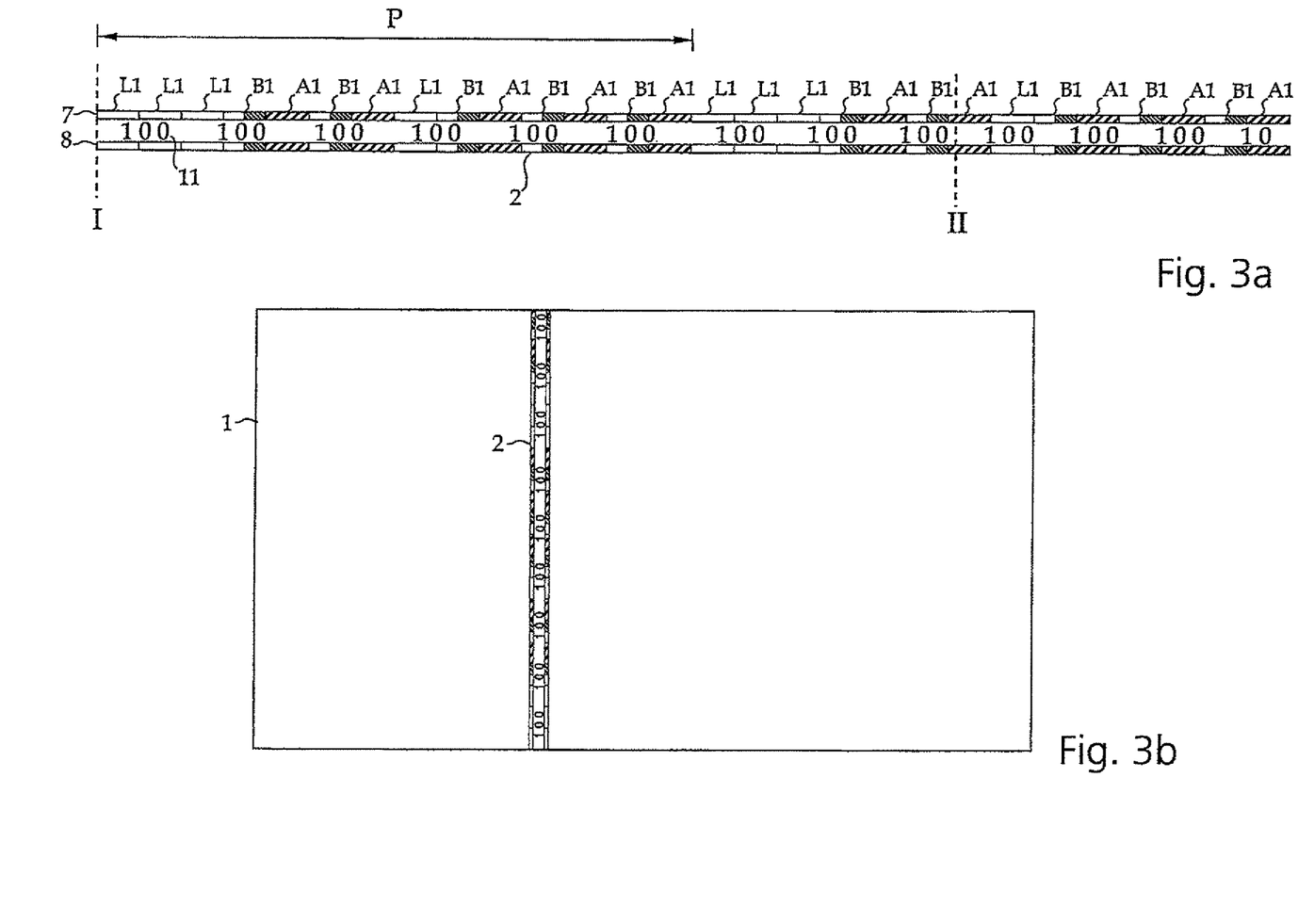

FIG. 3a shows a special embodiment of a security thread 2 with a magnetic coding, of which exactly two periods P are shown in FIG. 3a, cf. period 1). The inventive security element 2 consists for example of the portion that is limited by the markings I and II. Along a predetermined direction, e. g. from left to right in FIG. 3a, the coding elements A1, B1 and L1 are arranged in a certain order on the security element 2. The coding elements A1, B1 and L1 are arranged in the same order both in an upper and in a lower edge region of the security element 2 and form an upper 7 and a lower edge track 8 parallel to the longitudinal direction of the security element 2. Between the two edge tracks 7 and 8 that both have a width of approximately 0.1 to 1.2 mm, the security element 2 can additionally have marking elements 11, such as for example gaps in a metal layer forming digits, characters, symbols or the like.

In FIG. 3b a bank note 1 of paper or also plastic is shown that is provided with a security thread 2 that extends over the complete width of the bank note 1 and that can be embedded completely or partly in the bank note 1. The security thread 2 contains the portion marked with I to II of the magnetic coding shown in FIG. 3a. The bank note 1 of course can have further security features, such as watermark, steel gravure print, security thread, luminescent prints etc. The security thread 2 arranged on the bank note 1 can be printed on, glued on or incorporated in the bank note 1.

Figure 4:
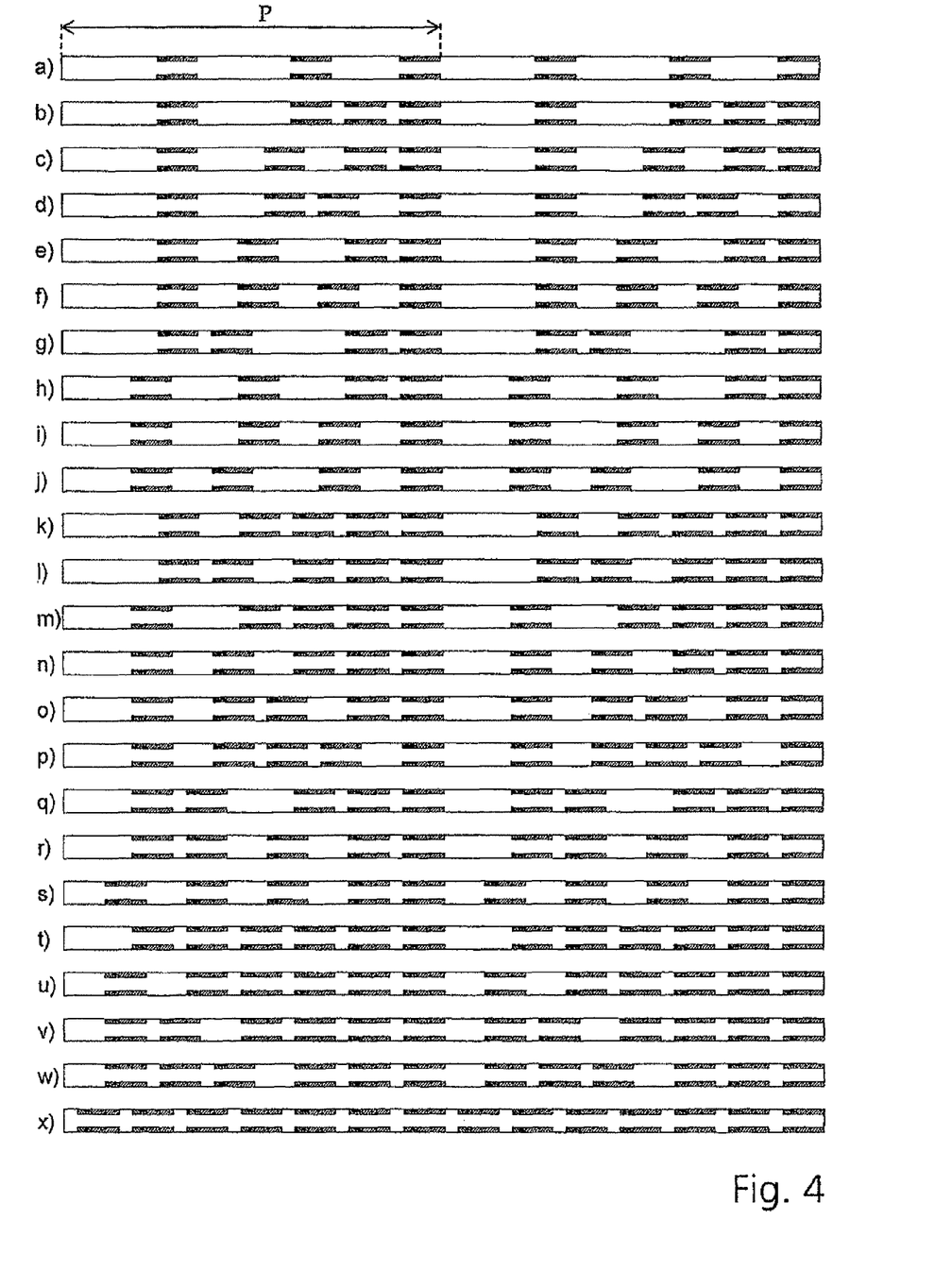
FIG. 4) picked by way of example, in which the coding elements (A1, B1, L1) are arranged parallel in two edge tracks of the security element, FIG. 3b a schematic view of a bank note with the security element having the portion I . . . II of the magnetic coding (1) of FIG. 3a, FIG. 4 a schematic view of respectively two periods P of a selection of magnetic codings with 14 coding elements, FIG. 5a-d measurement setup and magnetic signal $S_0$ of a magnetizing step of a magnetic region $M_0$, as well as measurement setups and magnetic signals $S_1$, $S_2$, $S_3$ and [sic] of a short magnetic region $M_1$, of a medium magnetic region $M_2$, whose magnetic signal is increased through constructive interference, and of a long magnetic region $M_3$, FIG. 5e two exemplary portions of security elements with magnetic partial regions, whose magnetic signal has a maximum amplitude that is increased through constructive interference.

FIG. 4 schematically shows portions of different magnetic codings that can be formed with the coding elements A1, B1, L1. Of each of the magnetic codings in FIG. 4 a portion of two periods P is shown. The period specified as I) defines the magnetic coding of the FIGS. 3a, b. Each period P contains 14 of the coding elements A1, B1, L1, which are arranged along the predetermined direction respectively in a certain order. The periods P shown in FIG. 4 are composed of the 14 coding elements in the following fashion:

a) L1L1L1B1A1L1L1L1B1A1L1L1B1A1 b) L1L1L1B1A1L1L1L1B1A1B1A1B1A1 c) L1L1L1B1A1L1L1B1A1L1B1A1B1A1 d) L1L1L1B1A1L1L1B1A1B1A1L1B1A1 e) L1L1L1B1A1L1B1A1L1L1B1A1B1A1 f) L1L1L1B1A1L1B1A1L1B1A1L1B1A1 g) L1L1L1B1A1B1A1L1L1L1B1A1B1A1 h) L1L1B1A1L1L1L1B1A1L1L1B1A1B1A1 i) L1L1B1A1L1L1B1A1L1B1A1L1B1A1 j) L1L1B1A1L1B1A1L1L1B1A1L1B1A1 k) L1L1B1A1L1B1A1B1A1B1A1B1A1 l) L1L1B1A1B1A1L1B1A1B1A1B1A1 m) L1L1B1A1L1L1B1A1B1A1B1A1B1A1 n) L1L1B1A1L1B1A1L1B1A1B1A1B1A1 o) L1L1B1A1L1B1A1B1A1L1B1A1B1A1 p) L1L1B1A1L1B1A1B1A1B1A1L1B1A1 q) L1L1B1A1B1A1L1L1B1A1B1A1B1A1 r) L1L1B1A1B1A1L1B1A1L1B1A1B1A1 s) L1B1A1L1B1A1L1B1A1L1B1A1B1A1 t) L1L1B1A1B1A1B1A1B1A1B1A1B1A1 u) L1B1A1L1B1A1B1A1B1A1B1A1B1A1 v) L1B1A1B1A1L1B1A1B1A1B1A1B1A1 w) L1B1A1B1A1B1A1L1B1A1B1A1B1A1 x) B1A1B1A1B1A1B1A1B1A1B1A1B1A1

The periods shown in FIG. 4 are a preferred selection of such periods which contain several directly mutually adjacent first magnetic regions 3 and second magnetic regions 5. Said directly mutually adjacent magnetic regions 3, 5 with different coercive strength are limited on both sides by first 4 and/or second gap regions 6. For the security element 2 any desired portion of the magnetic codings composed of the periods P can be used, however which portion is to contain at least one period, cf. FIGS. 3a, 3b. The at least one contained period can be one of the specified periods P, but it can also be a period that is modified through the above-mentioned modifications, e. g. a cyclically rotated period.

FIG. 5a-d illustrates different magnetic signals that result at one of the measuring tracks 8 of the magnetic sensor 10 when different security elements are transported past along their longitudinal direction. The security elements have magnetic regions $M_0$, $M_1$, $M_2$, $M_3$ of different lengths that are composed of the same magnetic material with the same concentration etc. Also the magnetization of the magnetic material is equal for all magnetic regions $M_0$, $M_1$, $M_2$, $M_3$. The magnetic regions $M_1$, $M_2$, $M_3$ are limited on both sides by far extended gap regions. The magnetic region $M_0$ is so far extended in the transport direction that the magnetic sensor 10 detects only the magnetic signal of the shown magnetization step at the start of the magnetic region $M_0$. Under the same measuring conditions (i. e. with the same magnetic sensor, same measuring geometry, same distance to the measuring track, same transport speed, etc.) the different magnetic regions $M_0$, $M_1$, $M_2$, $M_3$ cause different magnetic signals $S_0$, $S_1$, $S_2$, $S_3$ with different maximum amplitudes $I_0$, $I_1$, $I_2$, $I_3$. The magnetic signal $S_0$ of the magnetization step of the magnetic region $M_0$ is to be regarded here as the reference magnetic signal. The magnetic signal $S_0$ of the magnetization step of the magnetic region $M_0$ here is to be regarded as reference magnetic signal.

In comparison to the maximum amplitude $I_0$ of the reference magnetic signal $S_0$ the short magnetic region $M_1$ has a reduced maximum amplitude $I_1$, since the magnetic signals of the two very closely adjacent magnetization steps of the magnetic region $M_1$ cancel each other out at least partly. Proceeding from the short magnetic region $M_1$ a larger extension of the magnetic region in the transport direction of the security element 2 leads to an increase of the maximum amplitude, since the individual magnetic signals of the magnetization steps at the start and end of the magnetic region transported past then add up at least partly. In case that the maximum amplitude of a magnetic region (that is somewhat longer in comparison to $M_1$) exceeds the maximum amplitude $I_0$ of the reference magnetic signal $S_0$, this magnetic signal is increased through constructive interference. For example the magnetic signal $S_2$ of the medium magnetic region $M_2$ is increased through constructive interference and has a very high maximum amplitude $I_2$ that exceeds $I_0$ by far. With regard to a magnetic region $M_3$ with a relatively long extension in the transport direction, however, a reduction of the maximum amplitude $I_3$ results. If, starting at a certain length of the magnetic region the maximum amplitude $I_0$ of the reference magnetic region $M_0$ is not reached, the magnetic signal in question is no longer increased through constructive interference.

Figure 5A:
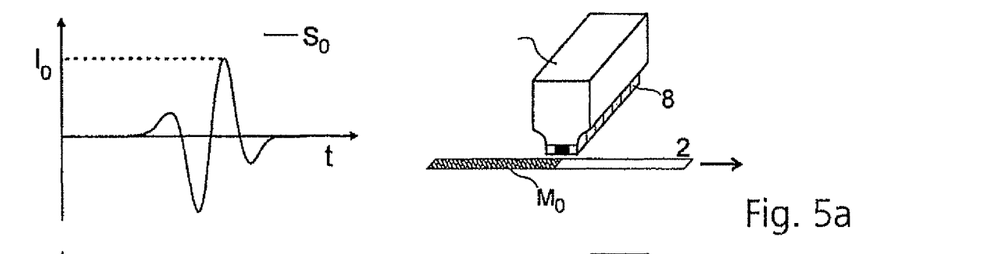
Figure 5B:
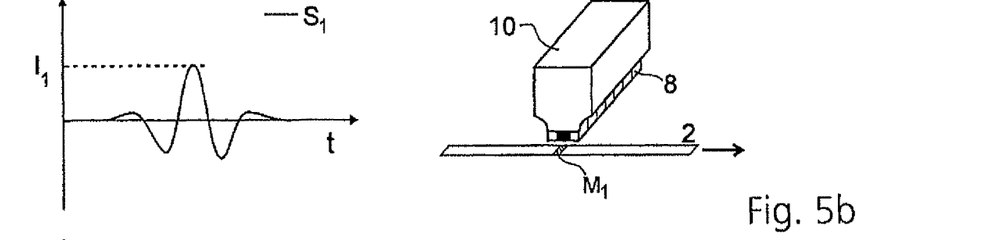
Figure 5C:
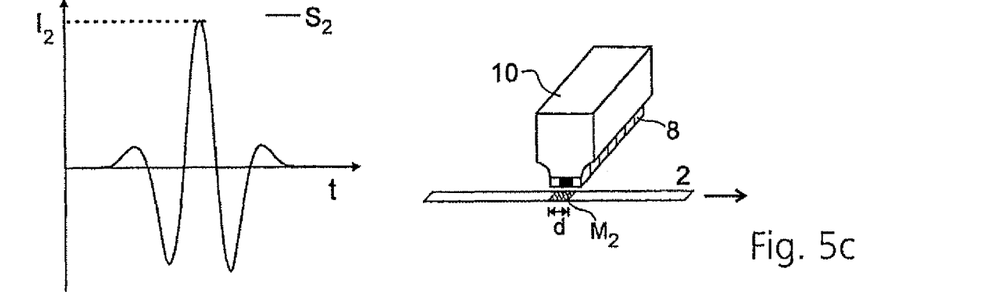
Figure 5D:
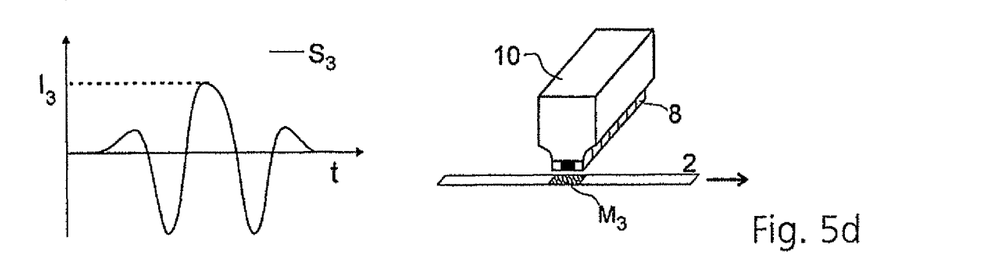
Figure 5E:
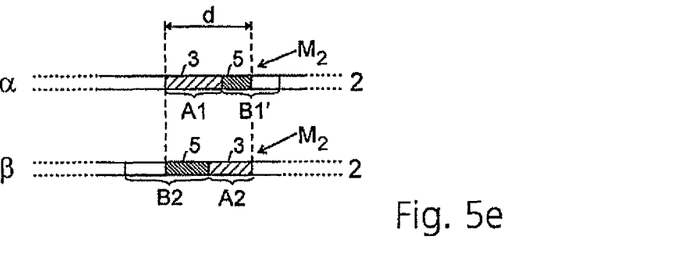

FIG. 5e shows by way of example two portions of security elements 2 with a magnetic partial region 15 in which the maximum amplitude of the magnetic signal during the transport past the magnetic sensor 10 is increased through constructive interference. The magnetic partial region 15 in the examples α and β consists respectively of a first magnetic region 3 and a second magnetic region 5, which can be part of two coding elements A1 and B1' (example α) or part of two coding elements B2 and A2 (example β). The magnetic partial region 15 is respectively limited on both sides by gap regions. In the examples α and β the length of the magnetic partial region 15 is in each case chosen in such a fashion that the magnetic signal of the magnetic partial region 15 is increased through constructive interference. To this magnetic signal also further magnetic regions can contribute which are arranged subsequent to these gap regions (not shown). The lengths and arrangements of these further magnetic regions are chosen in such a fashion that on the whole for the magnetic partial region 15 a magnetic signal results that is increased through constructive interference.

To assess whether the maximum amplitude of the magnetic signal of the magnetic partial region 15 is increased through constructive interference, said amplitude is to be compared with the maximum amplitude of a reference magnetic signal. As reference magnetic signal serves for example the magnetic signal $S_0$ of a magnetization step of a magnetic region $M_0$ with a long extension in the transport direction and with the same magnetization as the first and the second magnetic region.

The extension of the first and the second magnetic region required for constructive interference decisively depends on the temporal width of the magnetic signals of the individual magnetization steps at the start and the end of the first and second magnetic region transported past. This temporal width can be subject to several determining factors and generally depends on the functioning, e. g. inductive or magneto-resistive, and on the geometry of the magnetic sensor used. In the case of the inductively working magnetic sensor 10 the width and shape of the magnetic signal is influenced e. g. by the spatial extension of the detection range of the magnetic sensor 10. Both the arrangement and the extension of pole shoes, with the aid of which the inductive magnetic sensor 10 functions, play a role therein. Furthermore the width and shape of the magnetic signal also depends on the distance (measured perpendicularly to the transport direction) between the security element 2 or the document of value 1 transported past and the magnetic sensor 10. The length of the first and the second magnetic region required for constructive interference thus depends on the respective implementation of the magnetic signal measurement and has to be determined experimentally in the individual case. In the shown example of the inductive magnetic sensor 10 the length of the first and second magnetic region required for a constructive interference of the magnetic signals can amount up to 8 mm.

The invention claimed is:

1. A security element for securing documents of value, comprising:

at least one portion of a magnetic coding that has at least one first coding element and at least one second coding element, said coding elements being arranged along a predetermined direction, wherein the first coding element along the predetermined direction continuously has a first magnetic region with a first coercive field strength and wherein the second coding element has a first gap region and a second magnetic region with a second coercive field strength that differs from the first coercive field strength, wherein the first magnetic region continuously contains along the predetermined direction a first magnetic material, and the second magnetic region continuously contains along the predetermined direction a second magnetic material, wherein the first magnetic region along the predetermined direction is arranged directly adjacent to the second magnetic region and the sum of the lengths of the first magnetic region and of the second magnetic region along the predetermined direction amounts to a maximum of 8 mm, and wherein the first and second coercive field strengths differ by at least a factor of 5.

2. The security element according to claim 1, wherein the magnetic coding comprises at least one third coding element which, together with the first and the second coding elements, is arranged along the predetermined direction, said third coding element, along the predetermined direction, continuously having a second gap region.

3. The security element according to claim 1, wherein the first and the second magnetic regions are limited along the predetermined direction on both sides by at least one of a first gap region or a second gap region.

4. The security element according to claim 1, wherein the magnetic coding comprises a periodically recurring arrangement of the coding elements, wherein the coding elements along the predetermined direction are arranged in a predetermined order.

5. The security element according to claim 4, wherein the periodically recurring arrangement comprises 6 to 18 of the coding elements.

6. The security element according to claim 1, wherein the first and the second magnetic region along the predetermined direction are arranged side by side.

7. The security element according to claim 1, wherein the security element has along the predetermined direction a plurality of the directly mutually adjacent first and second magnetic regions.

8. The security element according to claim 1, wherein the sum of the lengths of the first and second magnetic regions along the predetermined direction is chosen in such a fashion that two magnetic signals that result at the start and end of the first and second magnetic regions when the security element is transported past a magnetic sensor parallel or contrary to the predetermined direction interfere with each other constructively.

9. The security element according to claim 1, wherein the first and the second magnetic regions have either or both approximately the same remanent flux density and remanent flux densities that differ from each other by a maximum of 10%.

10. A foil material comprising at least one security element according to claim 1, wherein the foil material comprises a transfer material.

11. A document of value comprising at least one security element according to claim 1, wherein, the document of value is a bank note or a security document or a product packaging, or security paper with at least one security element according to claim 1.

12. A measurement setup comprising at least one magnet sensor and at least one document of value according to claim 11.

13. The measurement setup according to claim 12, wherein a maximum amplitude ($I_2$) of at least one magnet signal ($S_2$) that results when the security element is transported past the magnet sensor is increased through constructive interference, wherein the transporting past the magnet sensor takes place essentially along or contrary to the predetermined direction, the magnet signal ($S_2$) being the magnet signal of the first and the second magnetic region.

14. A method for checking documents of value according to claim 11, comprising the steps:
transporting at least one of the documents of value according to claim 11 past a magnet sensor for measuring magnetic properties of the document of value and
receiving magnet signals of the security element with the aid of the magnet sensor.

15. The method according to claim 14, wherein a maximum amplitude ($I_2$) of at least one magnet signal ($S_2$) of the security element is increased through constructive interference.

16. A security element for securing documents of value, comprising
at least two gap regions and at least one magnetic partial region, said regions being arranged along a predetermined direction,
wherein the magnetic partial region has a first magnetic region with a first coercive field strength and a second magnetic region with a second coercive field strength, the first and the second coercive field strengths being different,
wherein the first magnetic region continuously contains along the predetermined direction a first magnetic material, and the second magnetic region continuously contains along the predetermined direction a second magnetic material,
wherein the first magnetic region and the second magnetic region along the predetermined direction are directly mutually adjacent, and
wherein the first and second coercive field strengths differ by at least a factor of 5.

17. The security element according to claim 16, wherein the magnetic partial region is limited along the predetermined direction by two of the gap regions.

18. The security element according to claim 16, wherein the security element has along the predetermined direction a plurality of spaced-apart magnetic partial regions, between which one or more of the gap regions are arranged.

19. The security element according to claim 16, wherein the gap regions comprise at least one of a first gap region or a second gap region, and each of the magnetic partial regions is limited by two first gap regions or by a first gap region and a second gap region.

20. The security element according to claim 16, wherein the gap regions and the magnetic partial region comprise parts of a magnetic coding.

* * * * *